US012651407B2

(12) United States Patent
Okubo

(10) Patent No.: US 12,651,407 B2
(45) Date of Patent: Jun. 9, 2026

(54) MACHINE LEARNING DEVICE AND VEHICLE

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 227 days.

(21) Appl. No.: 18/624,468

(22) Filed: Apr. 2, 2024

(65) Prior Publication Data

US 2024/0346752 A1     Oct. 17, 2024

(30) Foreign Application Priority Data

Apr. 11, 2023     (JP) ................................. 2023-064325

(51) Int. Cl.
  *G06T 17/00*     (2006.01)
  *G06T 5/60*     (2024.01)
  *G06T 19/20*     (2011.01)
(52) U.S. Cl.
  CPC ............... *G06T 17/00* (2013.01); *G06T 5/60* (2024.01); *G06T 19/20* (2013.01); *G06T 2207/20081* (2013.01); *G06T 2207/30252* (2013.01); *G06T 2219/2004* (2013.01)
(58) Field of Classification Search
  CPC ............ G06T 17/00; G06T 5/60; G06T 19/20
  See application file for complete search history.

(56) References Cited

U.S. PATENT DOCUMENTS

| | | | |
|---|---|---|---|
| 2022/0108130 A1* | 4/2022 | Cooper | G06V 10/772 |
| 2022/0114805 A1* | 4/2022 | Jarquin Arroyo | G06N 3/08 |

FOREIGN PATENT DOCUMENTS

JP          3349060 B2     11/2002

OTHER PUBLICATIONS

Honzatko et al, "Defect segmentation for multi-illumination quality control systems", MVA, 2021, pp. 1-17 (Year: 2021).*

* cited by examiner

*Primary Examiner* — Edward Park
(74) *Attorney, Agent, or Firm* — Rimon P.C.

(57) ABSTRACT

A machine learning device includes one or more processors, and one or more memories coupled to the one or more processors. The one or more processors are configured to cooperate with a program in the one or more memories to execute a process including acquiring image combinations multiple times, each of the image combinations including brightness images captured at different imaging positions and a training image associated with one of the brightness images, performing a manipulation process that includes manipulating the brightness images, and generating a machine learning model configured to receive the manipulated brightness images and the training image as input. The manipulation process includes a noise addition process that includes adding partial noise to different positions in the brightness images in an image combination of the image combinations.

8 Claims, 13 Drawing Sheets

FIG. 2

START

|S100

IMAGE ACQUISITION PROCESS

|S102

PREDICTION IMAGE
GENERATION PROCESS

|S104

SPECIFIC OBJECT
IDENTIFICATION PROCESS

END 180a, 180

| | FIRST BRIGHTNESS IMAGE 180a | SECOND BRIGHTNESS IMAGE 180b |
|---|---|---|
| PATTERN 1 | | |
| PATTERN 2 | | |

AVERAGE PRECISION (AP)

☐ SCALE CHANGE PROCESS AFTER NOISE ADDITION PROCESS
▨ NOISE ADDITION PROCESS AFTER SCALE CHANGE PROCESS

MACHINE LEARNING DEVICE AND VEHICLE

CROSS-REFERENCE TO RELATED APPLICATIONS

The present application claims priority from Japanese Patent Application No. 2023-064325 filed on Apr. 11, 2023, the entire contents of which are hereby incorporated by reference.

BACKGROUND

The disclosure relates to a machine learning device that generates a machine learning model, and a vehicle including a trained machine learning model.

As disclosed in Japanese Patent No. 3349060, there is known a technology of detecting a preceding vehicle ahead of a vehicle and reducing damage caused by collision with the preceding vehicle or executing follow-up control to keep a safe distance from the preceding vehicle.

SUMMARY

An aspect of the disclosure provides a machine learning device including one or more processors and one or more memories coupled to the one or more processors. The one or more processors are configured to cooperate with a program in the one or more memories to execute a process. The process includes acquiring image combinations multiple times, each of the image combinations including brightness images captured at different imaging positions and a training image associated with one of the brightness images, performing a manipulation process that includes manipulating the brightness images, and generating a machine learning model configured to receive the manipulated brightness images and the training image as input. The manipulation process includes a noise addition process that includes adding partial noise to different positions in the brightness images in an image combination of the image combinations.

An aspect of the disclosure provides a vehicle including a machine learning model to be obtained by a processor configured to cooperate with a program in a memory to execute a process. The process includes acquiring image combinations multiple times, each of the image combinations including brightness images captured at different imaging positions and a training image associated with one of the brightness images, performing a noise addition process that includes adding partial noise to different positions in the brightness images in an image combination of the combinations, and generating the machine learning model configured to receive the manipulated brightness images and the training image as input.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 2 is a functional block diagram illustrating schematic functions of an external environment recognition device;

FIG. 12 illustrates a comparative example of a trained machine learning model;

FIG. 14 illustrates another comparative example of the trained machine learning model;

FIG. 15 illustrates noise;

DETAILED DESCRIPTION

For example, a vehicle includes two imaging devices at different imaging positions, and determines a distance between the vehicle and a preceding vehicle based on a parallax between two captured images. Information on a specific object such as a preceding vehicle may be obtained by a machine learning model that receives two captured images as input.

In the machine learning, the accuracy of detection of the specific object can be improved by, for example, outputting, based on two images, two prediction results associated with one image and with the other image and appropriately extracting information on the specific object from the two prediction results. However, this machine learning model has a problem in that the processing load increases.

It is desirable to provide a machine learning device and a vehicle in which the accuracy of detection of the specific object can be improved by a simple method.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

(External Environment Recognition System 100)

Figure 1:
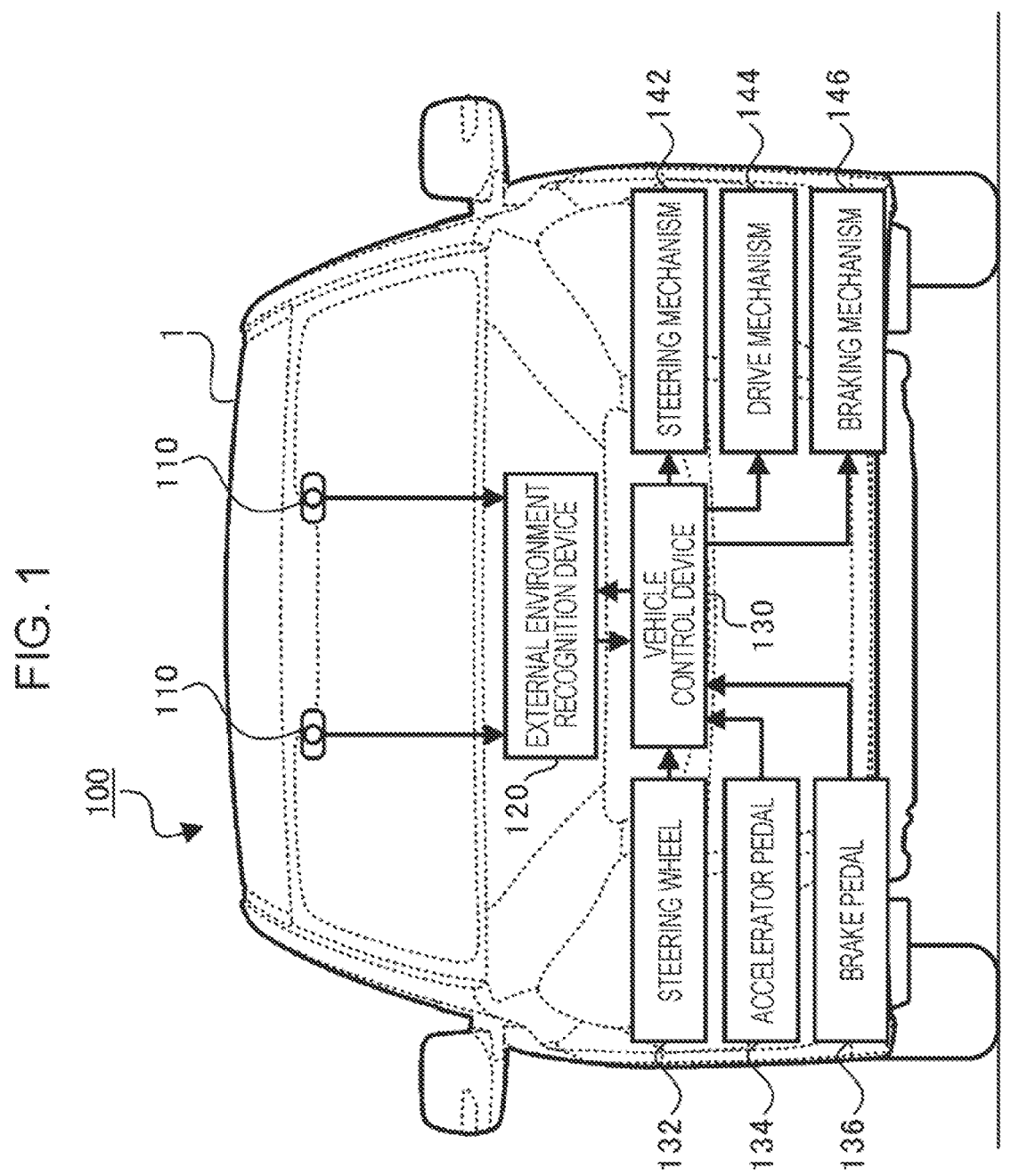
FIG. 1 is a block diagram illustrating a coupling relationship in an external environment recognition system.

FIG. 1 is a block diagram illustrating a coupling relationship in an external environment recognition system 100. The external environment recognition system 100 includes imaging devices 110, an external environment recognition device 120, and a vehicle control device 130.

The imaging device 110 includes an imaging element such as a charge-coupled device (CCD) or a complementary metal-oxide semiconductor (CMOS). The imaging device 110 captures an image of an external environment ahead of a vehicle 1. The imaging device 110 can generate a brightness image including information on at least a brightness on a pixel basis, such as an RGB image or a monochrome image. Two imaging devices 110 are disposed away from each other in a substantially horizontal direction with their optical axes substantially parallel to each other in a traveling direction of the vehicle 1. The imaging device 110 continuously generates brightness images showing three-dimensional objects in a detection area ahead of the vehicle 1, for example, at frames of 1/60 seconds.

The external environment recognition device 120 recognizes an external environment based on brightness images acquired from the imaging devices 110 or prediction images generated from two brightness images. The external environment recognition device 120 controls the speed and steering angle of the traveling vehicle 1 based on the recognized external environment and the traveling situation of the vehicle 1. The external environment recognition device 120 is described later in detail.

The vehicle control device 130 is an electronic control unit (ECU) that receives driver's operations on a steering wheel 132, an accelerator pedal 134, and a brake pedal 136 and controls a steering mechanism 142, a drive mechanism 144, and a braking mechanism 146 by referring to information generated by the external environment recognition device 120.

(External Environment Recognition Device 120)

Figure 2:
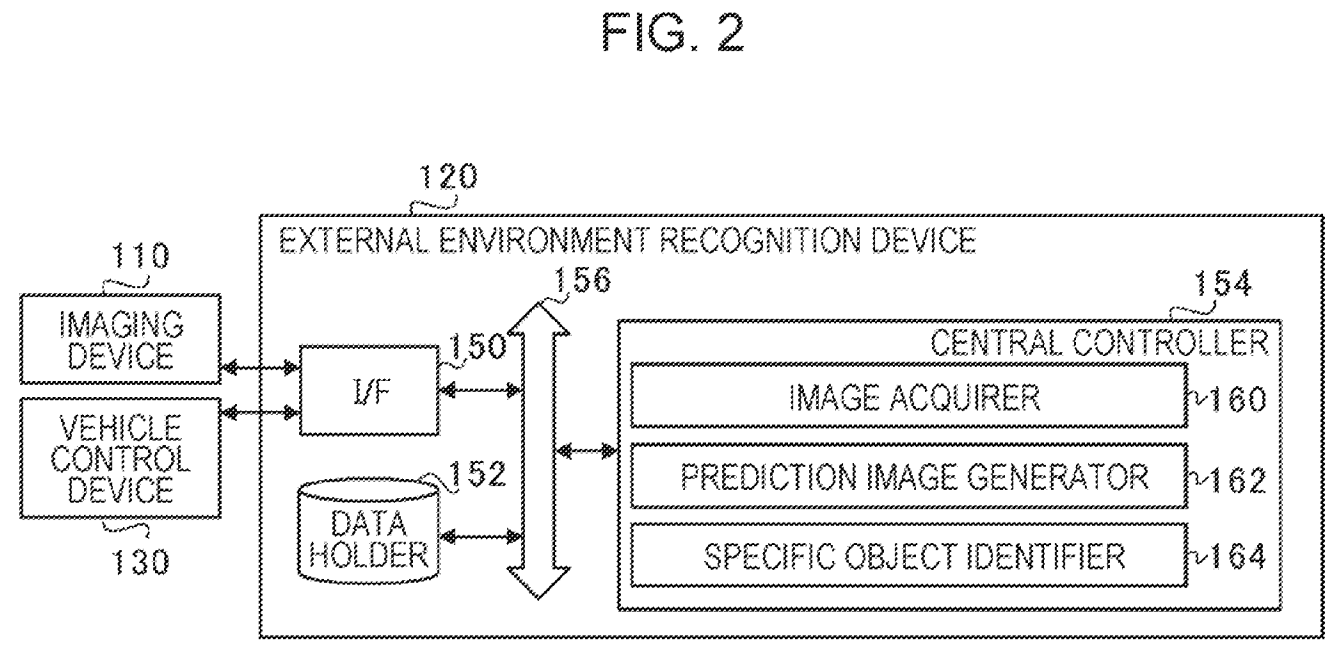

FIG. 2 is a functional block diagram illustrating schematic functions of the external environment recognition device 120. As illustrated in FIG. 2, the external environment recognition device 120 includes an I/F 150, a data holder 152, and a central controller 154.

The I/F 150 is an interface for bidirectionally exchanging information with the imaging devices 110 and the vehicle control device 130. The data holder 152 includes a RAM, a flash memory, an HDD, etc., and holds various types of information for use in processes to be executed by functional modules described below.

The central controller 154 is a semiconductor integrated circuit including a processor, a ROM that stores programs etc., and a RAM serving as a working area, and controls the I/F 150, the data holder 152, etc. via a system bus 156. In the central controller 154 of this embodiment, the processor cooperates with the programs in the ROM to serve as functional modules such as an image acquirer 160, a prediction image generator 162, and a specific object identifier 164.

(External Environment Recognition Method)

Figures 3, 4:
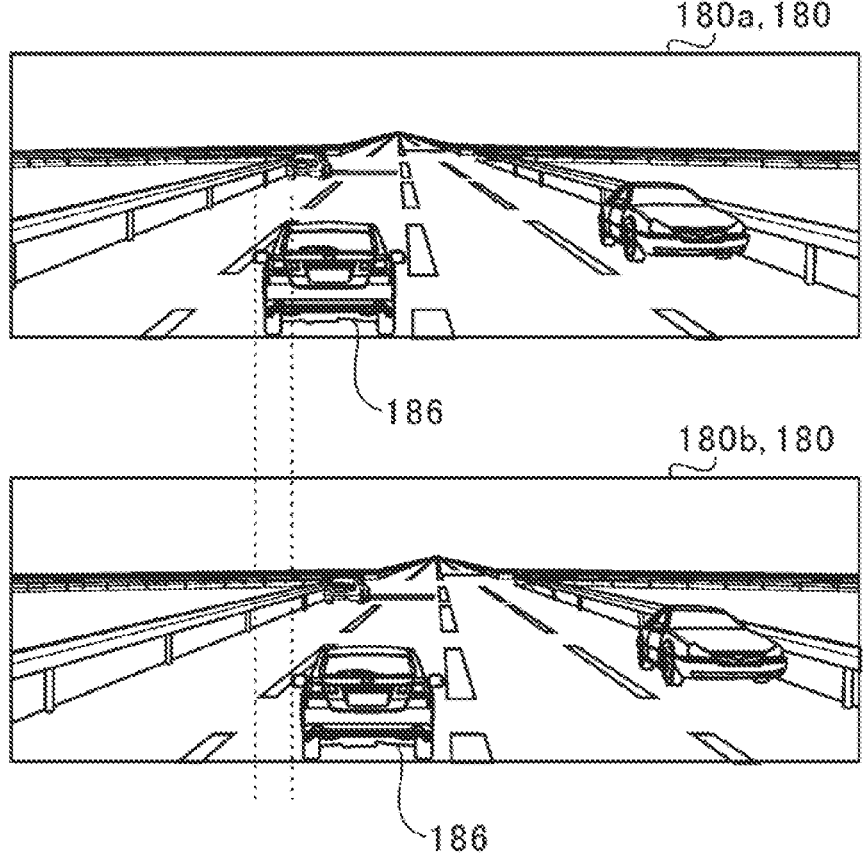
FIG. 3 is a flowchart illustrating a flow of an external environment recognition method.
FIG. 4 illustrates brightness images.

FIG. 3 is a flowchart illustrating a flow of an external environment recognition method. The external environment recognition device 120 executes the external environment recognition method at every predetermined interrupt time. In the external environment recognition method, the image acquirer 160 first acquires brightness images (S100). The prediction image generator 162 generates prediction images from the two brightness images (S102). The specific object identifier 164 identifies a specific object such as a preceding vehicle or a pedestrian based on the prediction images (S104). The three-dimensional objects and the specific objects to be recognized by the external environment recognition device 120 include not only independent objects such as a bicycle, a pedestrian, a vehicle, traffic lights, a traffic sign, a guardrail, a building, and a roadside wall, but also objects identified as part of the independent objects, such as a rear or side surface of a vehicle and a wheel of a bicycle. Processes in the external environment recognition method are described below in detail, and description is omitted for processes irrelevant to the features of this embodiment.

(Image Acquisition Process S100)

FIG. 4 illustrates brightness images. The image acquirer 160 acquires two brightness images 180 captured at the same timing by the imaging devices 110. For example, the image acquirer 160 acquires a first brightness image 180a captured by the imaging device 110 positioned on a relatively right side of the vehicle 1, and a second brightness image 180b captured by the imaging device 110 positioned on a relatively left side of the vehicle 1.

Referring to FIG. 4, the first brightness image 180a and the second brightness image 180b differ from each other in terms of positions of a three-dimensional object in the horizontal direction in the images due to a difference in the imaging positions of the imaging devices 110. For example, a three-dimensional object 186 in the first brightness image 180a is located on a relatively right side in the horizontal direction in the second brightness image 180b as indicted by broken lines in FIG. 4. The term "horizontal" means a lateral direction on the screen in the captured image, and a term "vertical" means a vertical direction on the screen in the captured image.

(Prediction Image Generation Process S102)

The prediction image generator 162 generates prediction images for identifying a three-dimensional object in the detection area ahead of the vehicle 1 from the first brightness image 180a and the second brightness image 180b acquired by the image acquirer 160. Although details are described later, machine learning using training data is executed in advance in this embodiment while receiving the two brightness images captured by the imaging devices 110 as input. The prediction image generator 162 generates the prediction images from the first brightness image 180a and the second brightness image 180b by using a machine learning model trained by the machine learning.

Figure 5:
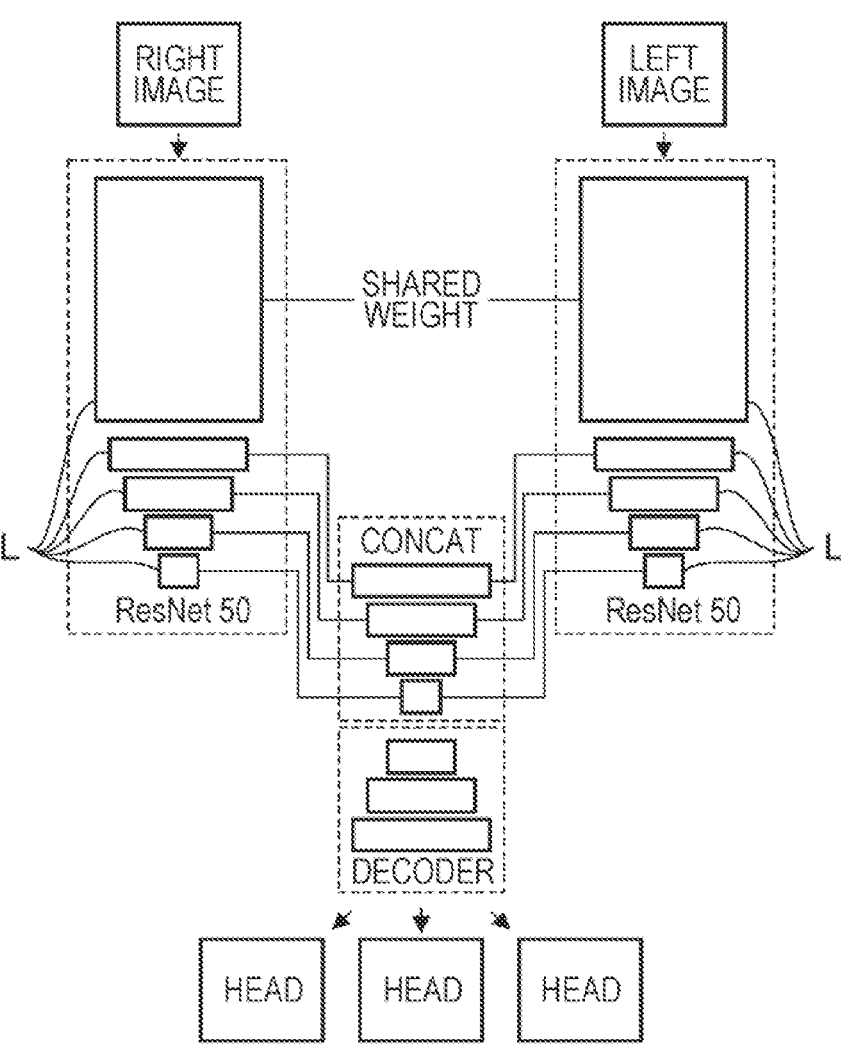
FIG. 5 illustrates the framework of machine learning.

FIG. 5 illustrates the framework of the machine learning. In this embodiment, deep learning is used as the machine learning. In the deep learning, intermediate layers based on a neural network (NN) are provided between input and output, and a rule or pattern is learned for each intermediate layer. A model using the structure of the NN in the deep learning may be referred to as "deep neural network (DNN)". A convolutional neural network (CNN) using convolutional calculation is described as an example of the DNN.

In the example of FIG. 5, a residual neural networks (ResNet) model is used as the backbone of the CNN. In the ResNet model, a combination of convolutional layers L and skip connection or a combination of the convolutional layers L and residual connection is repeated. The convolutional layers L include a residual block. The skip connection or the residual connection is direct coupling of any convolutional layers L while skipping other convolutional layers L located therebetween. For example, the depth of the convolutional layers L in the ResNet model is 50 layers.

In the example of FIG. 5, a pair of ResNet models is prepared. The first brightness image 180a and the second brightness image 180b are independently input to the pair of ResNet models. The weight for deriving a feature amount is a value common to the pair of ResNet models. Any appropriate weight that reduces a loss function, that is, reduces a prediction error, may be determined by a gradient method.

In the convolutional layers L, blocks each including multiple pixels such as 3×3 pixels are sequentially extracted and specific feature amounts are activated through a convolutional filter. At this time, the feature amount may be activated by using a rectified linear unit (ReLU) function in which the output value is zero when the input value is negative and the output value is the same as the input value when the input value is equal to or larger than zero.

The activated feature amounts are simplified by nonlinear downsampling in pooling layers subsequent to the convolutional layers L. Through the simplification, the number of parameters to be learned by the CNN is limited. In the CNN, the series of processes based on the convolutional layers L, the pooling layers, etc. is repeated.

Next, the convolutional layers L in the pair of ResNet models are coupled by a concatenate function that is a coupling function. Although the concatenate function is used as the coupling function, a Conv3D function that is a three-dimensional extension of the CNN may be used. The coupled convolutional layers L are upsampled by a decoder function and the image size is returned to the size at the time of input. Prediction results "head" derived in this manner are prediction images.

Although the ResNet models and the concatenate function of the CNN are described as the machine learning model that generates the prediction images from the first brightness image 180a and the second brightness image 180b, the machine learning model is not limited to this case. Various known technologies about the deep learning may be employed.

In this embodiment, the prediction image generator 162 generates three prediction images 182a, 182b, and 182c depending on tasks to identify three-dimensional objects in the detection area ahead of the vehicle 1. The prediction images 182a, 182b, and 182c are described below in detail.

In some embodiments, the prediction images 182a, 182b, and 182c are analogous to the first brightness image 180a or the second brightness image 180b in terms of structure. This is because the processing load is smaller if the prediction images 182 are generated based on the first brightness image 180a or the second brightness image 180b. This is also because the detection accuracy can easily be evaluated if the prediction images 182 are analogous to the first brightness image 180a or the second brightness image 180b. In this case, the prediction images 182a, 182b, and 182c are associated with the first brightness image 180a and the resolution, the angle of view, and the positions of the three-dimensional objects are the same as those in the first brightness image 180a.

Figure 6:
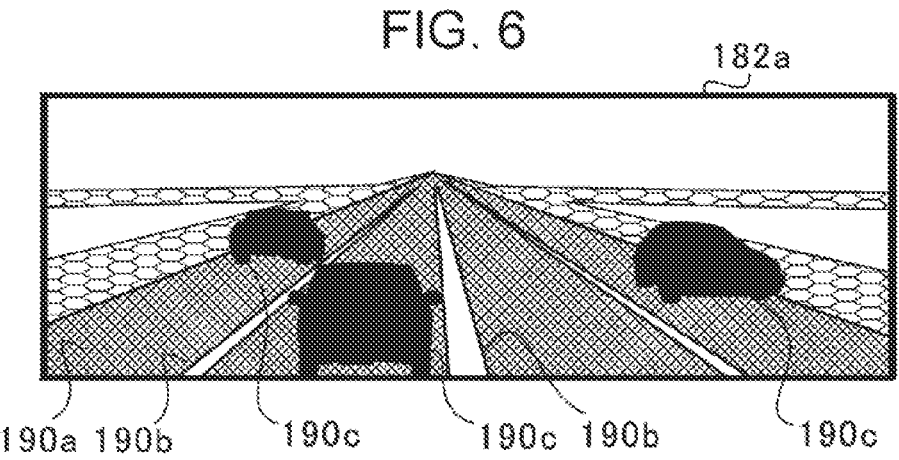
FIG. 6 illustrates a prediction image.

FIG. 6 illustrates the prediction image 182a. The prediction image 182a is obtained by dividing an image into objects by semantic segmentation. The prediction image 182a is used for a task of identifying objects. The semantic segmentation is a deep learning algorithm in which each pixel in the brightness image 180 is associated with a label, category, or class based on the meaning of the pixel as an image, together with an index indicating likelihood of the label, category, or class. For example, each pixel in the first brightness image 180a is associated with any one of classes selected from among a road surface, a lane marking line, a vehicle, a sidewalk, a fence, a pole, a cone, a tree, and a sky.

For example, the prediction image generator 162 derives probabilities of correspondence to the individual classes for each pixel in the first brightness image 180a. The probability of correspondence to a certain class is hereinafter referred to as "confidence level". For a certain pixel in the first brightness image 180a, the prediction image generator 162 associates a class having the highest confidence level with that pixel. In the prediction image 182a of FIG. 6, a pixel having the highest confidence level for a road surface is classified into a road surface class 190a. A pixel having the highest confidence level for a lane marking line is classified into a lane marking line class 190b. A pixel having the highest confidence level for a vehicle is classified into a vehicle class 190c. As a confidence level of the entire group of pixels classified into the same class, the prediction image generator 162 may use an average or median of the confidence levels of all the pixels in the group.

Through the semantic segmentation, the external environment recognition device 120 can collectively recognize the group of pixels of the characteristic class such as the vehicle class indicating a vehicle even if part of either or both of the first brightness image 180a and the second brightness image 180b is not clear.

Figure 7:
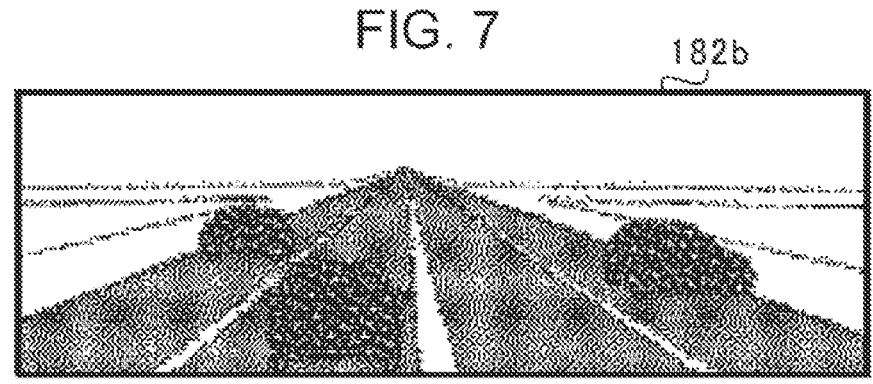
FIG. 7 illustrates a prediction image.

FIG. 7 illustrates the prediction image 182b. The prediction image 182b shows a parallax of each three-dimensional object in the image. The prediction image 182b is used for a task of determining a relative distance from each three-dimensional object. The prediction image generator 162 associates a difference between a horizontal position in the first brightness image 180a and a horizontal position in the second brightness image 180b for each pixel or block having a strong possibility of indicating the same three-dimensional object with the pixel. In this way, each pixel in the prediction image 182b has a parallax in addition to the horizontal position and the vertical position in the prediction image 182b. The prediction image generator 162 converts the parallax into a relative distance (z) by a so-called stereo method, thereby deriving three-dimensional positional information of each pixel, that is, the horizontal position (x), the vertical position (y), and the relative distance (z).

Figure 8:
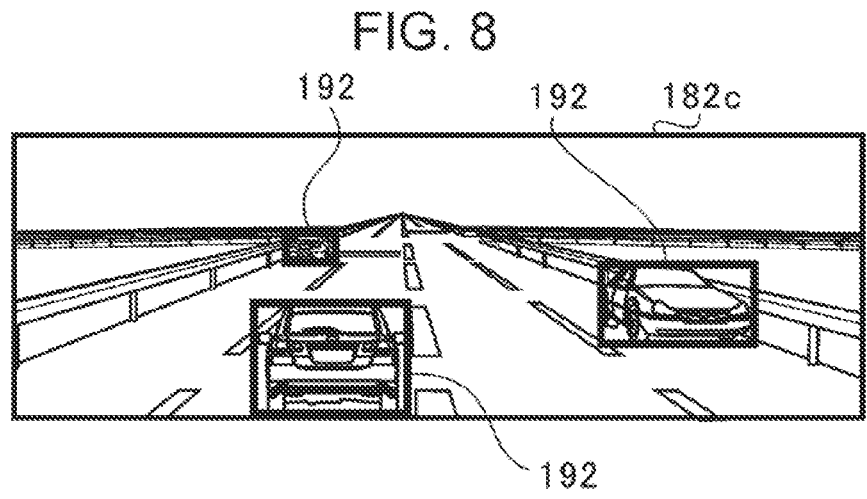
FIG. 8 illustrates a prediction image.

FIG. 8 illustrates the prediction image 182c. The prediction image 182c shows a predetermined area occupied by each three-dimensional object in the image. The prediction image 182c is used for a task of identifying each three-dimensional object itself. The prediction image generator 162 groups pixels whose horizontal positions (x), vertical positions (y), and relative distances (z) are within a predetermined range, and determines these pixels as a three-dimensional object. At this time, the prediction image generator 162 may group pixels whose amounts of movement from a previous frame, that is, relative speeds, are within a predetermined range, and determine these pixels as a three-dimensional object. The prediction image generator 162 determines whether the three-dimensional object is a three-dimensional object to be extracted based on the size, shape, color, etc. of the three-dimensional object.

The prediction image generator 162 defines an area occupied by the three-dimensional object to be extracted by enclosing the three-dimensional object with a rectangular box 192 including the right and left ends of the horizontal position and the upper and lower ends of the vertical position of the three-dimensional object. If the three-dimensional object is a vehicle and its rear and side surfaces can be distinguished, the prediction image generator 162 can independently show an area occupied by the rear surface of the vehicle and an area occupied by the side surface of the vehicle as the areas occupied by the vehicle.

(Specific Object Identification Process S104)

The specific object identifier 164 first identifies a road surface ahead of the vehicle 1 by using the brightness images 180 and the prediction images 182. The specific object identifier 164 identifies three-dimensional objects located vertically above the identified road surface. For example, the specific object identifier 164 sets a block located at a predetermined vertical distance from the road surface, such as 0.3 m or more, as a candidate for a specific object projecting in the vertical direction from the road surface. The specific object identifier 164 determines whether the candidate for the specific object is a predetermined specific object such as a preceding vehicle, a pedestrian, or a building. Various known technologies can be applied to the determination about the specific object, and therefore detailed description thereof is omitted. In this way, the specific object such as a preceding vehicle or a pedestrian can be identified and collision with the specific object can be avoided appropriately.

As described above, the machine learning using the CNN is executed in this embodiment, and the trained machine learning model illustrated in FIG. 5 is applied to the external environment recognition system 100. The machine learning using the CNN is described below.

(Machine Learning System 200)

Figure 9:
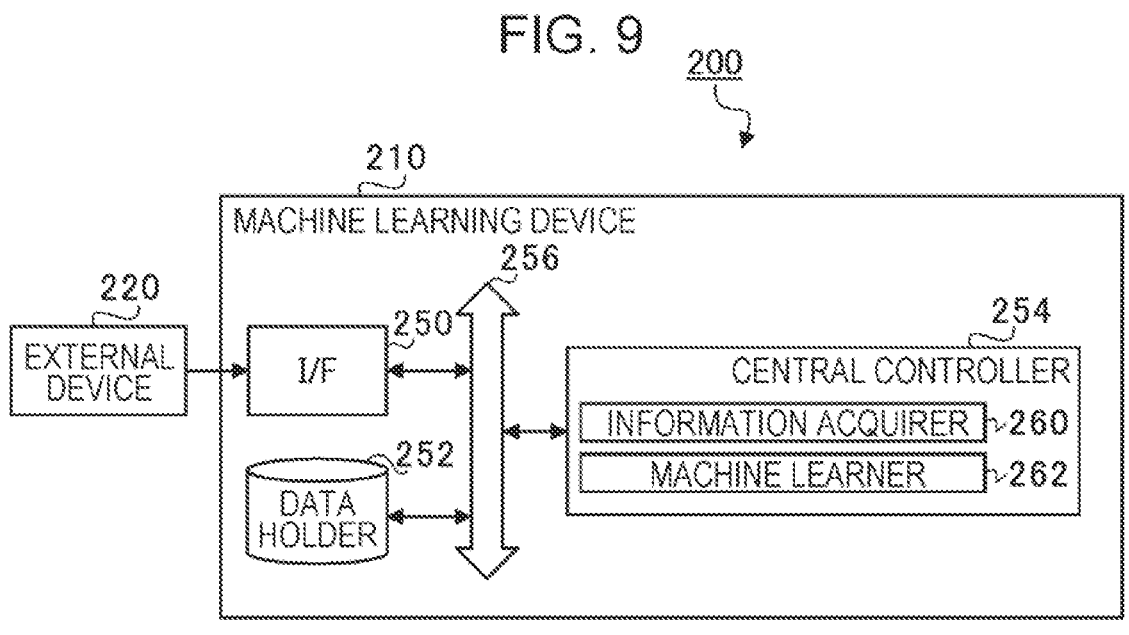
FIG. 9 is a block diagram illustrating a coupling relationship in a machine learning system.

FIG. 9 is a block diagram illustrating a coupling relationship in a machine learning system 200. The machine learning system 200 includes a machine learning device 210 and an external device 220. The machine learning device 210 executes machine learning using the CNN. The external device 220 transmits, to the machine learning device 210, input data, that is, the first brightness image 180*a* and the second brightness image 180*b*, and training images corresponding to training data in association with each other.

The machine learning device 210 includes an I/F 250, a data holder 252, and a central controller 254. The I/F 250 is an interface for receiving brightness images captured in advance and training images corresponding to the training data from the external device 220. The data holder 252 includes a RAM, a flash memory, an HDD, etc., and holds various types of information for use in processes to be executed by functional modules described below.

The central controller 254 is a semiconductor integrated circuit including a processor, a ROM that stores programs etc., and a RAM serving as a working area, and controls the I/F 250, the data holder 252, etc. via a system bus 256. In the central controller 254 of this embodiment, the processor cooperates with the programs in the ROM to serve as functional modules such as an information acquirer 260 and a machine learner 262.

(Machine Learning Method)

Figure 10:
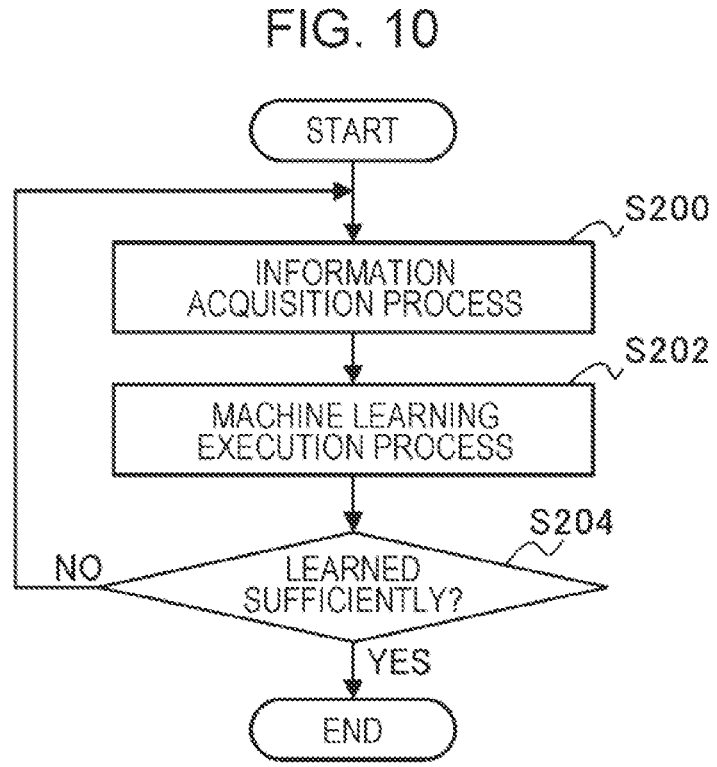
FIG. 10 is a flowchart illustrating a flow of a machine learning method.

FIG. 10 is a flowchart illustrating a flow of a machine learning method. In the machine learning method, the information acquirer 260 first acquires combinations of the first brightness image 180*a* and the second brightness image 180*b* captured at different imaging positions and training images associated with one of the first brightness image 180*a* and the second brightness image 180*b* from the external device 220 multiple times (S200). The machine learner 262 generates a machine learning model that receives the combinations of the first brightness image 180*a*, the second brightness image 180*b*, and the training images as input (S202). The machine learner 262 determines whether a sufficient amount of machine learning has been executed and the machine learning model has converged, that is, whether the machine learning has been completed (S204). When the machine learning model has converged (YES in S204), the machine learning method is terminated. When the machine learning model has not converged (NO in S204), the processes are repeated from the information acquisition process S200.

Figure 11:
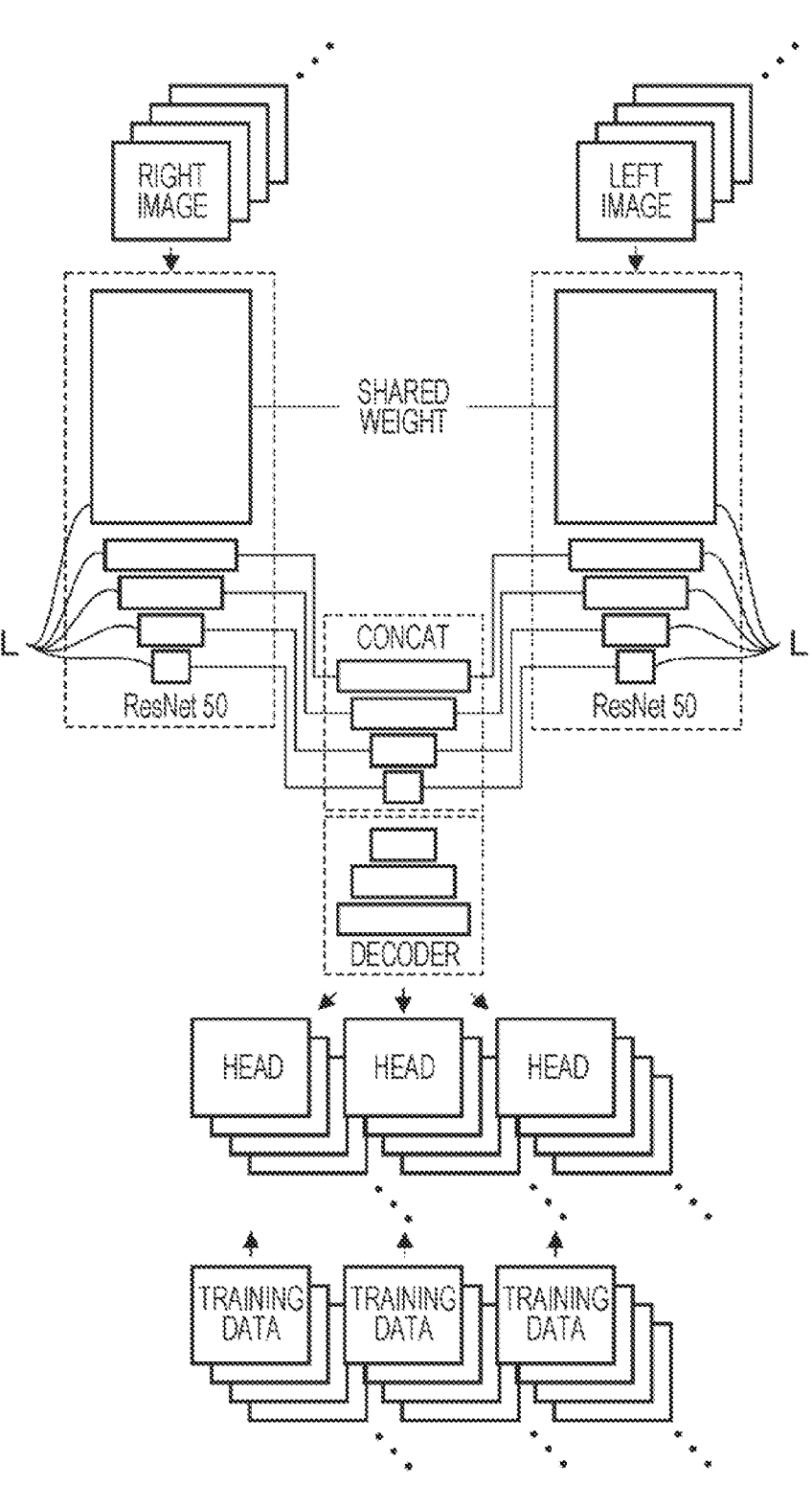
FIG. 11 illustrates the machine learning.

FIG. 11 illustrates the machine learning. As described above, the deep learning using the CNN is executed as the machine learning in this embodiment. The CNN machine learning model is substantially the same as the machine learning model described with reference to FIG. 5. Therefore, detailed description thereof is omitted and description is made focusing on the machine learning.

As illustrated in FIG. 11, the machine learner 262 inputs the first brightness image 180*a* to one of the pair of ResNet models and the second brightness image 180*b* to the other of the pair of ResNet models. The machine learner 262 inputs training images associated with the first brightness image 180*a* and the second brightness image 180*b* to the machine learning model. The training images are input as training data to be compared with the prediction images 182*a*, 182*b*, and 182*c* to appropriately output the prediction images 182*a*, 182*b*, and 182*c*. In this way, the machine learning is executed so that the prediction images 182*a*, 182*b*, and 182*c* become closer to the training images.

The training images are images in which the resolution, the angle of view, and the positions of the three-dimensional objects are the same as those in the first brightness image 180*a*, and are generated in association with the prediction images 182*a*, 182*b*, and 182*c*, respectively. Therefore, the prepared training images are three images that are an image obtained by dividing an image into objects by semantic segmentation, an image showing a parallax of each object, and an image showing a predetermined area occupied by each three-dimensional object. The external environment recognition device 120 can appropriately output the prediction images 182 by using the trained machine learning model generated in this way.

In this embodiment, the machine learning method is discussed to improve the robustness of the machine learning model. During the machine learning, the machine learner 262 does not directly input the first brightness image 180*a* and the second brightness image 180*b* to the ResNet models of FIG. 11, but inputs the first brightness image 180*a* and the second brightness image 180*b* subjected to predetermined manipulation. The process for manipulating the first brightness image 180*a* and the second brightness image 180*b* may be referred to simply as "manipulation process". The manipulation process is executed on the first brightness image 180*a* and the second brightness image 180*b*, and is not executed on the training images corresponding to the training data. The machine learning is executed while receiving the first brightness image 180*a* and the second brightness image 180*b* subjected to the manipulation process as input.

For example, the machine learner 262 does not input the first brightness image 180*a* or the second brightness image 180*b*, or inputs "no information" for the first brightness image 180*a* or the second brightness image 180*b*.

Figure 12:
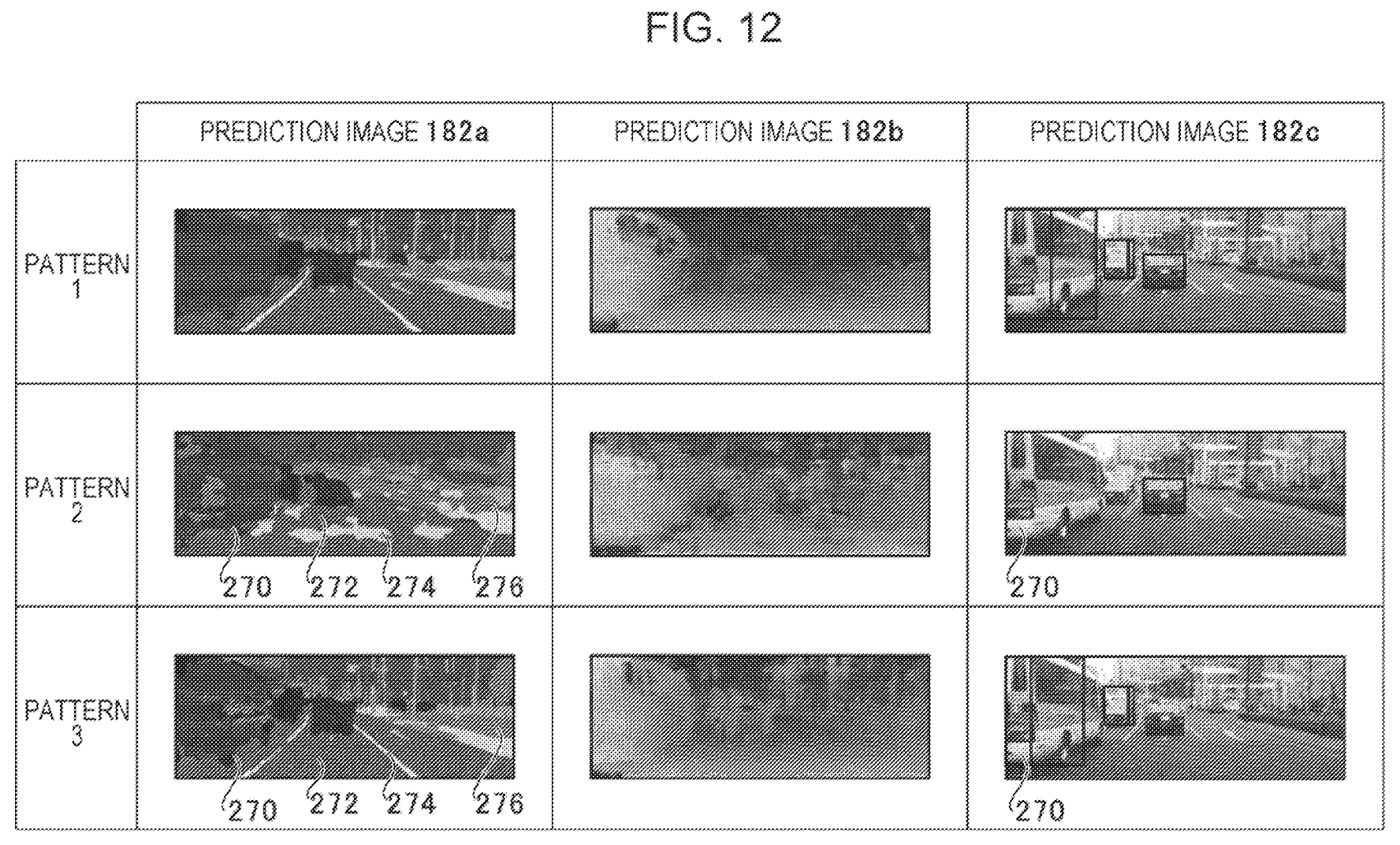

FIG. 12 illustrates a comparative example of the trained machine learning model. FIG. 12 illustrates three prediction images 182*a*, 182*b*, and 182*c* output by using the machine learning model trained in three patterns. Pattern 1 indicates a case where the manipulation process is not executed as a comparison. Pattern 2 indicates a case where the first brightness image 180*a* is not input, that is, the machine learning is executed with the second brightness image 180*b* alone. Pattern 3 indicates a case where the second brightness image 180*b* is not input, that is, the machine learning is executed with the first brightness image 180*a* alone.

In this embodiment, the prediction images 182*a*, 182*b*, and 182*c* that are output results of the machine learning are images in which the resolution, the angle of view, and the positions of the three-dimensional objects are the same as those in the first brightness image 180*a*. Therefore, the prediction images 182*a*, 182*b*, and 182*c* have higher dependence levels on the first brightness image 180*a* than on the second brightness image 180*b*. In Pattern 1 of FIG. 12, the first brightness image 180*a* and the second brightness image 180*b* are directly input to the ResNet models without manipulation. Thus, the output results of the machine learning depend greatly on the first brightness image 180*a*, and the complementation function of the second brightness image 180*b* is not exerted sufficiently.

Comparing Pattern 1 with Patterns 2 and 3 of FIG. 12, the accuracy of detection of the specific object using the prediction images 182*a*, 182*b*, and 182*c* is lower in a case where the first brightness image 180*a* or the second brightness image 180*b* is not input than in a case where both the first brightness image 180*a* and the second brightness image 180*b* are input.

For example, the shape of the closest preceding vehicle 270 is unclear in the prediction images 182*a* of Patterns 2 and 3. The prediction images 182*b* of Patterns 2 and 3 have many portions where the parallax cannot be recognized. In the prediction images 182*c* of Patterns 2 and 3, the three-dimensional object cannot be extracted appropriately. This is because one of the images is not present and therefore the amount of information for deriving feature amounts decreases and the complementation function of one image to complement the other image is not exerted sufficiently.

In Pattern 2, the decrease in the detection accuracy is conspicuous compared with Pattern 3. As described above, the prediction images 182*a*, 182*b*, and 182*c* have higher dependence levels on the first brightness image 180*a* in which the resolution, the angle of view, and the positions of the three-dimensional objects are the same than on the second brightness image 180*b*. In Pattern 2, however, the prediction images 182*a*, 182*b*, and 182*c* are output based on the second brightness image 180*b* alone without referring to the first brightness image 180*a*. The detection accuracy decreases because the image from a certain viewpoint is used to estimate the image from a different viewpoint.

For example, in the prediction image 182*a* of Pattern 2, the preceding vehicle 270, a road surface 272, a lane marking line 274, and a tree 276 are all unclear. In the prediction image 182*b* of Pattern 2, the parallax cannot be recognized. In the prediction image 182*c* of Pattern 2, the closest preceding vehicle 270 cannot be extracted appropriately.

In view of this, the machine learner 262 inputs the first brightness image 180*a* or the second brightness image 180*b* while adding partial noise to it. The process for extending the data for the machine learning by manipulating the data may be referred to as "data augmentation".

Figure 13:
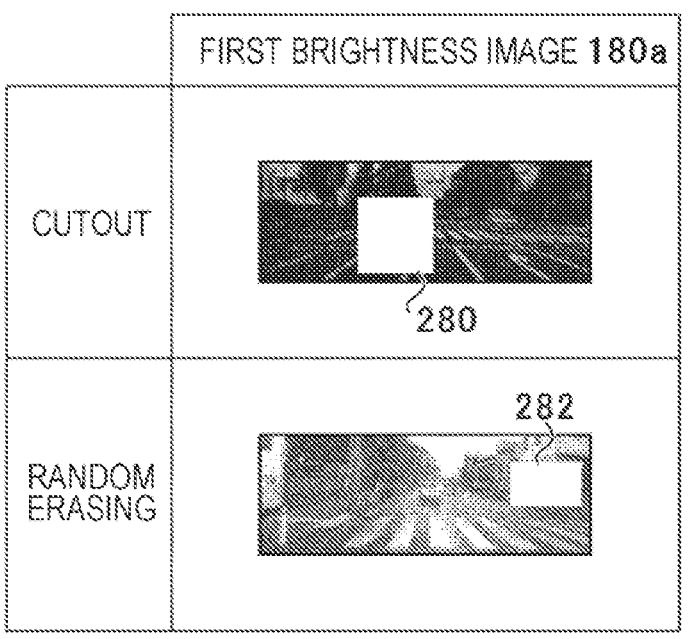
FIG. 13 illustrates noise.

FIG. 13 illustrates the noise. As illustrated in FIG. 13, the machine learner 262 adds the noise to the first brightness image 180*a* by using, for example, a cutout function. In the cutout function, a square area 280 centered at a random position in the image is masked with a fixed value "0". For example, the length of each side of the mask is fixed and one portion is masked at one timing. However, the length of each side of the mask may be changed randomly. Two or more different portions may be masked at one timing. The color of the mask may be white or black, or white noise may be used.

As illustrated in FIG. 13, the machine learner 262 may add the noise to the first brightness image 180*a* by using, for example, a random erasing function. In the random erasing function, an area 282 centered at a random position in the image and having a random length-to-width ratio is masked in a predetermined color. For example, the color of the mask is white and one portion is masked at one timing. However, the color of the mask may be gray or black, or white noise may be used. The color of the mask may be changed randomly. Two or more different portions may be masked at one timing. The machine learner 262 may use a blur function for blurring the image or a sharpness function with a Gaussian function.

Figure 14:
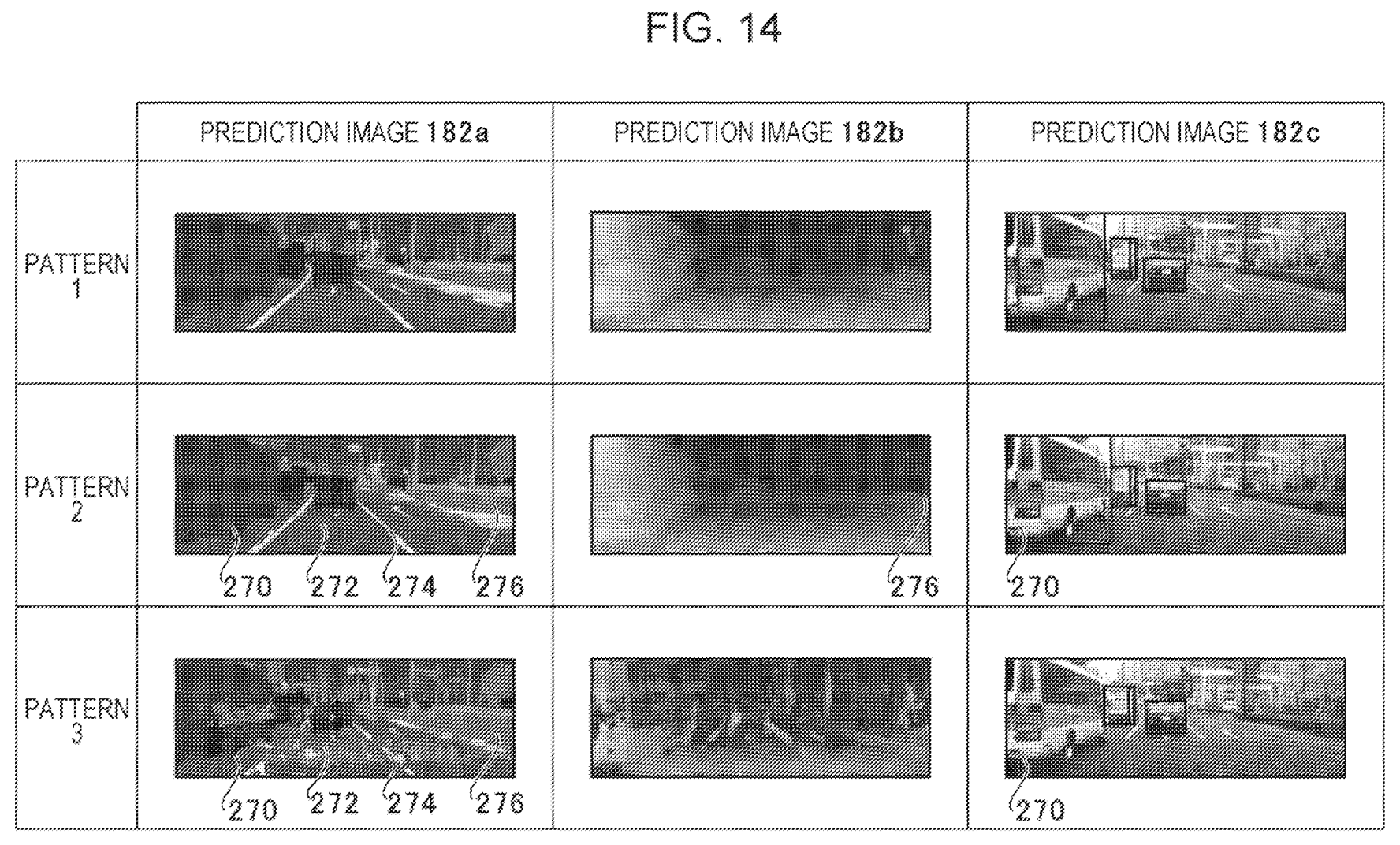

FIG. 14 illustrates another comparative example of the trained machine learning model. FIG. 14 illustrates three prediction images 182*a*, 182*b*, and 182*c* output by using the machine learning model trained in three patterns as in FIG. 12. Pattern 1 indicates a case where the manipulation process is not executed as a comparison as in Pattern 1 of FIG. 12. Pattern 2 indicates a case where the machine learning is executed with the first brightness image 180*a* input while adding partial noise to it and the second brightness image 180*b* input directly. Pattern 3 indicates a case where the machine learning is executed with the second brightness image 180*b* input while adding partial noise to it and the first brightness image 180*a* input directly.

Comparing Pattern 1 and Pattern 2 of FIG. 14, the detection accuracy is slightly lower in Pattern 2 than in Pattern 1. This is because the complementation function of the second brightness image 180*b* is exerted on the partial noise in the first brightness image 180*a* but the complementation function of the first brightness image 180*a* is not sufficiently exerted on the second brightness image 180*b*.

For example, in the prediction image 182*a* of Pattern 2, the preceding vehicle 270, the road surface 272, the lane marking line 274, and the tree 276 are slightly unclear. In the prediction image 182*b* of Pattern 2, the parallax of the tree 276 on the right side of the road surface is unclear. In the prediction image 182*c* of Pattern 2, the rear surface area of the closest preceding vehicle 270 cannot be extracted appropriately.

Comparing Pattern 1 and Pattern 3 of FIG. 14, the detection accuracy of Pattern 3 is much lower. This is because the complementation function of the first brightness image 180*a* is exerted on the partial noise of the second brightness image 180*b* but the complementation function of the second brightness image 180*b* is not sufficiently exerted on the first brightness image 180*a*. Therefore, the detection accuracy in the first brightness image 180*a* with the high dependence level decreases. Further, the detection accuracy decreases because the image from a certain viewpoint is used to estimate the image from a different viewpoint. Thus, the detection accuracy of Pattern 3 is lower than that of Pattern 2.

For example, in the prediction image 182*a* of Pattern 3, the preceding vehicle 270, the road surface 272, the lane marking line 274, and the tree 276 are all unclear. In the prediction image 182*b* of Pattern 3, the parallax cannot be recognized. In the prediction image 182*c* of Pattern 3, the closest preceding vehicle 270 cannot be extracted appropriately.

In view of this, the machine learner 262 inputs both the first brightness image 180*a* and the second brightness image 180*b* while adding partial noise to them. If the noise is added to the same position in the first brightness image 180*a* and the second brightness image 180*b* at the same timing, the noise portion of one image cannot be complemented by the other image. Therefore, the machine learner 262 adds the partial noise to different positions in the first brightness image 180*a* and the second brightness image 180*b*. The process for adding the partial noise to different positions in the first brightness image 180*a* and the second brightness image 180*b* in the same combination may be referred to as "noise addition process".

Figure 15:
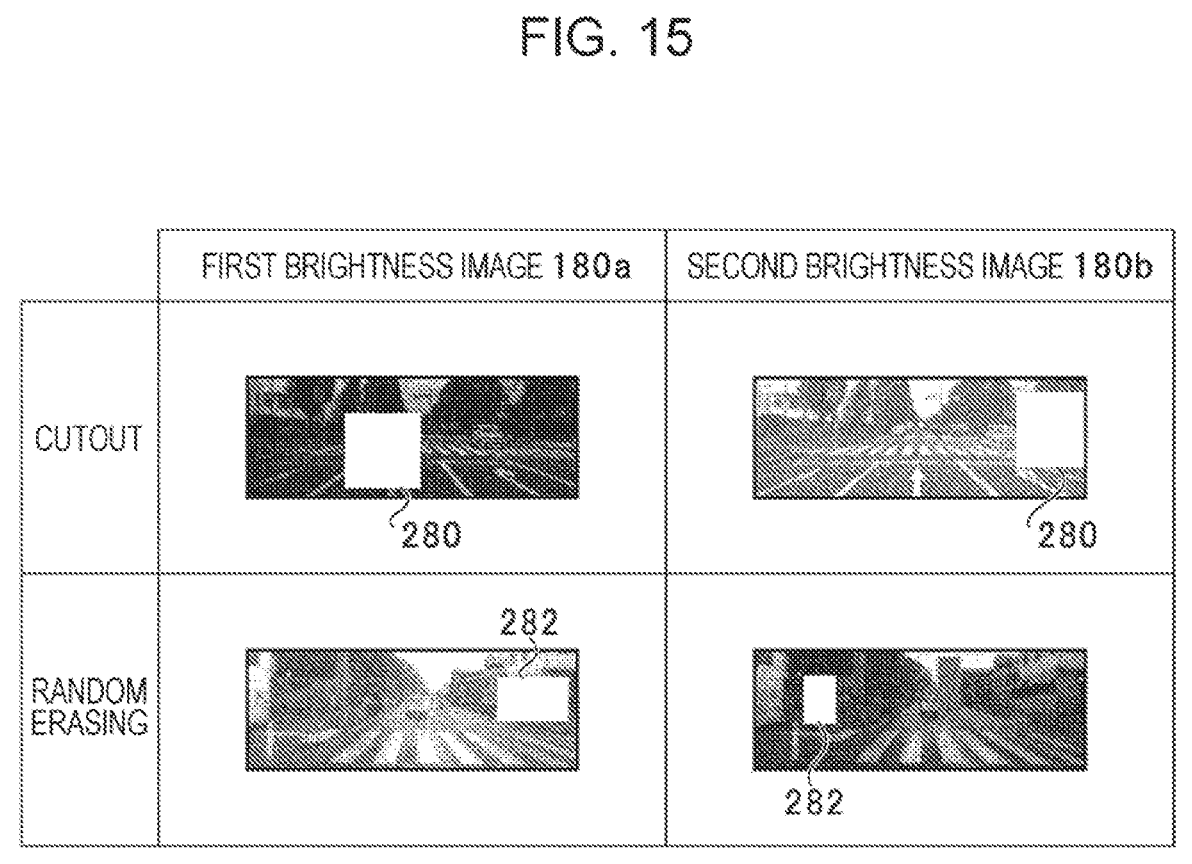

FIG. 15 illustrates the noise. As illustrated in FIG. 15, the machine learner 262 adds noise corresponding to the square area 280 to different positions in the first brightness image 180*a* and the second brightness image 180*b* by using, for example, the cutout function. As illustrated in FIG. 15, the machine learner 262 may add noise corresponding to the area 282 having a random length-to-width ratio to different positions in the first brightness image 180*a* and the second brightness image 180*b* by using, for example, the random erasing function. The machine learner 262 may use the blur function for blurring the image or the sharpness function with the Gaussian function. The noise may be added to the first brightness image 180*a* and the second brightness image 180*b* by different functions.

At least the positions of the noise to be added to the first brightness image 180*a* and the second brightness image 180*b* are varied. The position of the noise refers to the central position or the center-of-gravity position. The machine learner 262 may add the noise in a partially overlapping state as long as the central positions or the center-of-gravity positions differ from each other.

Figure 16:
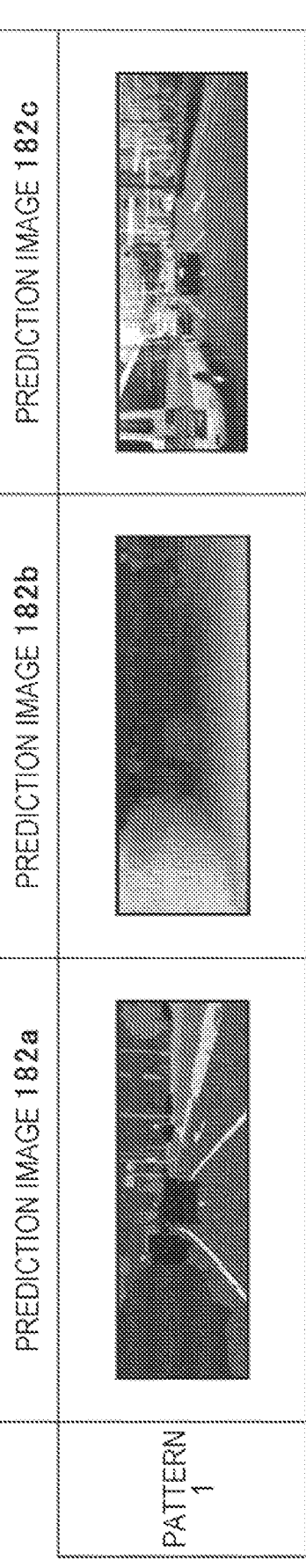
FIG. 16 illustrates another comparative example of the trained machine learning model.

FIG. 16 illustrates another comparative example of the trained machine learning model. In FIG. 16, partial noise is added to different positions in the first brightness image 180*a* and the second brightness image 180*b*. The complementation function of the second brightness image 180*b* is exerted on the partial noise in the first brightness image 180*a*, and the complementation function of the first brightness image 180*a* is exerted on the noise in the second brightness image 180*b*. Therefore, even if the noise is included in the first brightness image 180*a* or the second brightness image 180*b*, the noise portion is complemented by the other image. Thus, the robustness can be improved.

In the data augmentation, noise can be added to the entire first brightness image 180*a* and the entire second brightness image 180*b* instead of the part of the first brightness image 180*a* and the part of the second brightness image 180*b*. For example, the machine learner 262 changes the overall scales of the first brightness image 180*a* and the second brightness image 180*b*. The process for changing the scale of the data for the machine learning by manipulating the data may be referred to as "scale data augmentation". If the scales of the first brightness image 180*a* and the second brightness image 180*b* are increased, the machine learner 262 may cut out part of the images.

In this embodiment, the relative distance (z) from the three-dimensional object is determined by deriving the parallax of the three-dimensional object as in the prediction image 182*b*. The parallax can appropriately be derived if pixels or blocks having a strong possibility of indicating the same three-dimensional object are present in the horizontal direction of the first brightness image 180*a* and the second brightness image 180*b*. In some embodiments, the vertical positional relationship and the proportion of the three-dimensional object are made equal in the first brightness image 180*a* and the second brightness image 180*b* to appropriately derive the parallax.

In view of this, the machine learner 262 changes the scales of the first brightness image 180*a* and the second brightness image 180*b* under the condition that the scale factors or the angles of view of the first brightness image 180*a* and the second brightness image 180*b* are equal to each other and the dispositions of the first brightness image 180*a* and the second brightness image 180*b* are the same. The process for changing the scales of the first brightness image 180*a* and the second brightness image 180*b* may be referred to as "scale change process".

Figures 17, 18:
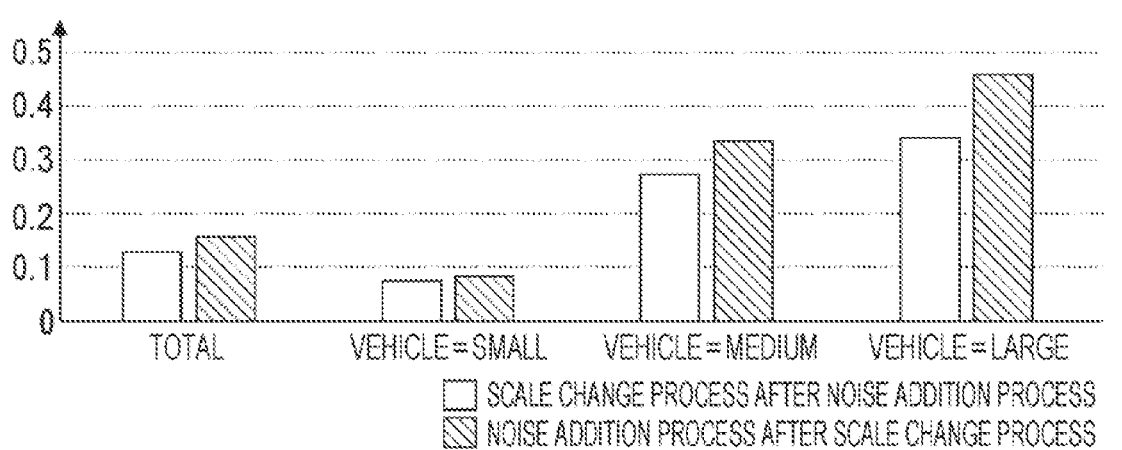
FIG. 17 illustrates an example of a scale change process.
FIG. 18 illustrates the vehicle detection accuracy of a manipulation process.

FIG. 17 illustrates an example of the scale change process. In Pattern 1, the first brightness image 180*a* and the second brightness image 180*b* are input while being enlarged and cut out on the same scale. In Pattern 2, the first brightness image 180*a* and the second brightness image 180*b* are reduced. In Pattern 1, the enlargement factors and the cutout positions of the first brightness image 180*a* and the second brightness image 180*b* are the same. In Pattern 2, the reduction factors and the dispositions of the first brightness image 180*a* and the second brightness image 180*b* are the same.

In this way, the machine learner 262 sets the same scale factor and disposition for the first brightness image 180*a* and the second brightness image 180*b* in the scale change process. Therefore, the vertical positional relationship and the proportion of the three-dimensional object are made equal in the first brightness image 180*a* and the second brightness image 180*b*. Thus, the parallax can be derived appropriately.

As described above, the manipulation process of this embodiment includes the scale change process for changing the scales of the first brightness image 180*a* and the second brightness image 180*b*, and the noise addition process for adding partial noise to different positions in the first brightness image 180*a* and the second brightness image 180*b* in the same combination. The detection accuracy varies depending on the order of these two processes.

FIG. 18 illustrates the vehicle detection accuracy of the manipulation process. FIG. 18 illustrates an average precision (AP) for each size of the vehicle. FIG. 18 illustrates the average precision in a case where Intersection over Union (IoU) that is an overlap degree is 0.5 to 0.95. The detection accuracy increases as the average precision increases. The overall evaluation of all vehicles, evaluation of a small-size vehicle, evaluation of a large-size vehicle, and evaluation of a medium-size vehicle are made independently.

Referring to FIG. 18, the average precisions for all the vehicle sizes are higher in a case where the noise addition process is executed after the scale change process than in a case where the scale change process is executed after the noise addition process. Therefore, the detection accuracy is higher in the case where the noise addition process is executed after the scale change process. This is because the area where the noise is added in the noise addition process is outside the range of the image in the scale change process. Thus, the detection accuracy can be improved by the simple method.

Although the exemplary embodiment of the disclosure is described above with reference to the accompanying drawings, the embodiment of the disclosure is not limited to this embodiment. It is understood that various modifications and revisions are conceivable by persons having ordinary skill in the art within the scope of claims and are included in the technical scope disclosed herein.

The series of processes to be executed by each device of this embodiment (e.g., the machine learning device 210 or the vehicle 1) may be implemented by using software, hardware, or a combination of software and hardware. Programs serving as software are prestored in, for example, non-transitory media provided inside or outside each device. For example, the programs are read from the non-transitory medium (e.g., a ROM), loaded in a transitory medium (e.g., a RAM), and executed by a processor such as a CPU.

The programs for implementing the functions of each device can be created and installed in a computer of each device. A processor executes the programs stored in a memory to execute the processes of the functions. At this time, the programs may be executed by multiple processors in cooperation, or may be executed by a single processor. The functions of each device may be implemented by cloud computing using multiple computers coupled to each other via a communication network. The programs may be installed by being provided to the computer of each device through distribution from an external device via a communication network.

According to the embodiment of the disclosure, the accuracy of detection of the specific object can be improved by the simple method.

The central controller 154 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the central controller 154 including the image acquirer 160, the prediction image generator 162, and the specific object identifier 164. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A machine learning device comprising:
one or more processors; and
one or more memories coupled to the one or more processors,
wherein the one or more processors are configured to cooperate with a program in the one or more memories to execute a process comprising:
acquiring, multiple times, a combination at least including:
a first brightness image captured at a first imaging position;
a second brightness image captured at a second imaging position different from the first imaging position; and
a training image associated with the first brightness image;
for each acquired combination, adding partial noise to the first brightness image and the second brightness image, the partial noise being added at positions different from each other in the first brightness image and the second brightness image; and
training a machine learning model configured to generate a prediction image from the first brightness image and the second brightness image for identifying a three-dimensional object in a detection area ahead of a vehicle by using, as input, the first brightness image and the second brightness image after the partial noise is added, and the training image, such that the machine learning model learns to use one of the first brightness image and the second brightness image to complement a noise-added portion of the other, thereby obtaining the machine learning model.

2. The machine learning device according to claim 1, wherein the process further comprises, for each acquired combination, changing scales of the first brightness image and the second brightness image, and
wherein the partial noise is added to the first brightness image and the second brightness image after the scales of the first brightness image and the second brightness image are changed.

3. The machine learning device according to claim 1, wherein the process further comprises changing scales of the first brightness image and the second brightness image such that the first brightness image and the second brightness image have a same scale factor and a same disposition.

4. The machine learning device according to claim 1, wherein the prediction image has a same resolution as the first brightness image, the prediction image has a same angle of view as the first brightness image, and positions of three-dimensional objects in the prediction image are the same as positions of the three-dimensional objects in the first brightness image.

5. A vehicle comprising:
a first imaging device configured to capture a first brightness image of an external environment ahead of the vehicle from a first imaging position;
a second imaging device configured to capture a second brightness image of the external environment ahead of the vehicle from a second imaging position different from the first imaging position;
one or more processors; and
one or more memories coupled to the one or more processors,
wherein the one or more processors are configured to cooperate with a program in the one or more memories to:
receive the first brightness image and the second brightness image;
input the first brightness image and the second brightness image to a trained machine learning model, the trained machine learning model having been trained by a process including:
acquiring, multiple times, a combination at least including
a first training brightness image captured at a first training imaging position,
a second training brightness image captured at a second training imaging position different from the first training imaging position, and
a training image associated with the first training brightness image;
for each acquired combination, adding partial noise to the first training brightness image and the second training brightness image, the partial noise being added at positions different from each other in the first training brightness image and the second training brightness image; and
training the machine learning model by using, as input, the first training brightness image and the second training brightness image after the partial noise is added, and the training image;
generate, by the trained machine learning model, a prediction image from the first brightness image and the second brightness image for identifying a three-dimensional object in a detection area ahead of the vehicle; and
identify, based on the prediction image, a specific object in the detection area ahead of the vehicle.

6. The vehicle according to claim 5, wherein the one or more processors are further configured to generate information for controlling a speed and a steering angle of the vehicle based on the identified specific object and a traveling situation of the vehicle.

7. The vehicle according to claim 6, further comprising a vehicle control device configured to control a steering mechanism, a drive mechanism, and a braking mechanism by referring to the information generated by the one or more processors.

8. The vehicle according to claim 5, wherein the prediction image has a same resolution as the first brightness image, the prediction image has a same angle of view as the first brightness image, and positions of three-dimensional objects in the prediction image are the same as positions of the three-dimensional objects in the first brightness image.

* * * * *